US010295070B2

(12) United States Patent
Czarnecki et al.

(10) Patent No.: US 10,295,070 B2
(45) Date of Patent: May 21, 2019

(54) CHECK VALVES

(71) Applicant: Hamilton Sundstrand Corporation, Charlotte, NC (US)

(72) Inventors: Pawel Czarnecki, Świdnica (PL); Theodoros Sergiadis, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/590,404

(22) Filed: May 9, 2017

(65) Prior Publication Data

US 2017/0328484 A1 Nov. 16, 2017

(30) Foreign Application Priority Data

May 10, 2016 (EP) .................................... 16461521

(51) Int. Cl.

*F16K 15/02* (2006.01)
*F16K 15/00* (2006.01)
*F16K 31/12* (2006.01)

(52) U.S. Cl.

CPC ............ *F16K 15/021* (2013.01); *F16K 15/00* (2013.01); *F16K 31/12* (2013.01)

(58) Field of Classification Search

CPC ......... F16K 15/021; F16K 31/12; F16K 15/00
USPC .......................................... 137/512.1, 625.33
See application file for complete search history.

(56) References Cited

U.S. PATENT DOCUMENTS

| | | | | |
|---|---|---|---|---|
| 1,023,885 A * | 4/1912 | Smyth | F16K 15/038 | 137/512.1 |
| 2,496,834 A | 2/1950 | Ward | | |
| 2,859,771 A * | 11/1958 | Blagg | F16K 15/148 | 137/512.15 |
| 3,094,140 A | 6/1963 | Miller | | |
| 3,118,467 A | 1/1964 | Kuhn | | |
| 3,319,560 A | 5/1967 | Schaaf | | |
| 4,599,081 A * | 7/1986 | Cohen | A61F 2/2409 | 137/512.1 |
| 6,174,232 B1 | 1/2001 | Stoll et al. | | |
| 2012/0177510 A1 | 7/2012 | Delong et al. | | |

FOREIGN PATENT DOCUMENTS

| | | |
|---|---|---|
| GB | 2514953 A | 12/2014 |
| JP | H09151838 A | 6/1997 |

OTHER PUBLICATIONS

Extended European Search Report for International Application No. 16461521.3, dated Nov. 3, 2016, 6 pages.

* cited by examiner

*Primary Examiner* — P. Macade Nichols
(74) *Attorney, Agent, or Firm* — Cantor Colburn LLP

(57) ABSTRACT

The present disclosure relates to a rotary check valve, which utilizes the rotation of a rotary element to open and close the valve, rather than pivoting of hinge flappers, such as in other check valve designs. The rotary element is rotatably mounted to a valve plate which features shrouded openings that define windows. A plurality of vanes extending from the rotary element are used to close or open the windows in response to a reverse or forward fluid flow, respectively. This action opens or closes the valve. This design may reduce the force exerted on the valve components when the valve opens and closes, when compared to a pivoting hinge flapper design.

15 Claims, 3 Drawing Sheets

CHECK VALVES

FOREIGN PRIORITY

This application claims priority to European Patent Application No. 16461521.3 filed 10 May 2016, the entire contents of which is incorporated herein by reference.

TECHNICAL FIELD

The present disclosure relates to check valves.

BACKGROUND

It is known to use check valves to allow fluid flow in one direction therethrough, and to prevent flow in the opposite direction. Check valves are widely used in a wide variety of applications, for example in air conditioning systems, for example in aircraft air conditioning systems.

One form of check valve includes a pair of hinged flappers that pivot open in the direction of fluid flow when the fluid pressure differential exceeds a predetermined valve "cracking pressure". If a negative pressure differential exists across the valve, the flapper elements close, preventing flow reversal.

Such check valves typically include a pair of flapper elements and frequently employ stops or bumpers which restrict the opening movement of the flapper element past a predetermined maximum opening angle. Such a check valve is disclosed in, for example, GB 2514953.

When the cracking pressure is exceeded the flapper elements may open at high speed. When they subsequently cooperate with the stops/bumpers high stresses may be generated. This may lead to reduced part life and increased maintenance costs.

SUMMARY

Disclosed herein is a check valve. The check valve comprises a valve plate comprising a plurality of openings therethrough and a shroud extending from the valve plate around each of the openings. The shroud and the valve plate define an at least partially circumferentially facing window. The check valve also comprises a rotary element rotatably mounted to the valve plate about a rotational axis. The rotary element comprises a plurality of radially extending vanes and is mounted such that each vane is positioned between two adjacent shrouds. The vanes are angled such that fluid flow incident thereon in a direction parallel to said rotational axis will rotate the rotary element about the rotational axis. The rotary element is rotatable between an open position in which the vanes are spaced circumferentially from the windows to allow fluid to flow through the windows via the openings, and a closed position in which the vanes close the windows, thereby preventing fluid flow therethrough.

In an embodiment of the above check valve, a lower portion of the window is defined by a lip upstanding from the valve plate. Additionally, the lip may have a profile complementary to that of the vane to create an area contact therebetween.

In a further embodiment of any of the above check valves, the vanes engage around the respective edges of the windows to close the windows. Additionally, a sealing element may be provided around the edges of each window, and the sealing element may be resilient.

In a further embodiment of any of the above check valves, each shroud comprises a bumper surface configured to contact a respective vane along a length thereof in the open position. Additionally, the bumper surface may have a profile complementary to that of the vane to create an area contact therebetween. Further additionally or alternatively, the bumper surface may comprise a separate bumper element.

In a further embodiment of any of the above check valves, the vanes rotate about the rotational axis between the closed and open valve positions through an angle of between 10° and 20°, more narrowly 14° to 18°, for example, 16°.

In a further embodiment of any of the above check valves, the valve plate comprises between 10 and 16 openings and the rotary element comprises the same number of vanes.

In a further embodiment of any of the above check valves, the valve plate comprises 12 openings and the rotary element comprises 12 vanes.

In a further embodiment of any of the above check valves, the vanes have an airfoil cross-section.

In a further embodiment of any of the above check valves, the vanes feature a twist along their radial axis.

In a further embodiment of any of the above check valves, the rotary element is rotatably mounted onto a shaft extending from the valve plate.

BRIEF DESCRIPTION OF THE DRAWINGS

Some exemplary embodiments of the present disclosure will now be described by way of example only, and with reference to the following drawings in which.

DETAILED DESCRIPTION

With reference to FIGS. 1 to 4, a check valve 2 is illustrated. Check valve 2 is configured to be mounted around its periphery in or to, for example, a duct in order to prevent reverse flow of a fluid through the duct. As shown, the check valve 2 comprises a static, generally circular valve plate 10 and a rotary element 20, which is rotatably mounted to the valve plate 10 about rotational axis R. Although circular in this embodiment, the valve plate 10 may be of any shape.

Figure 5:
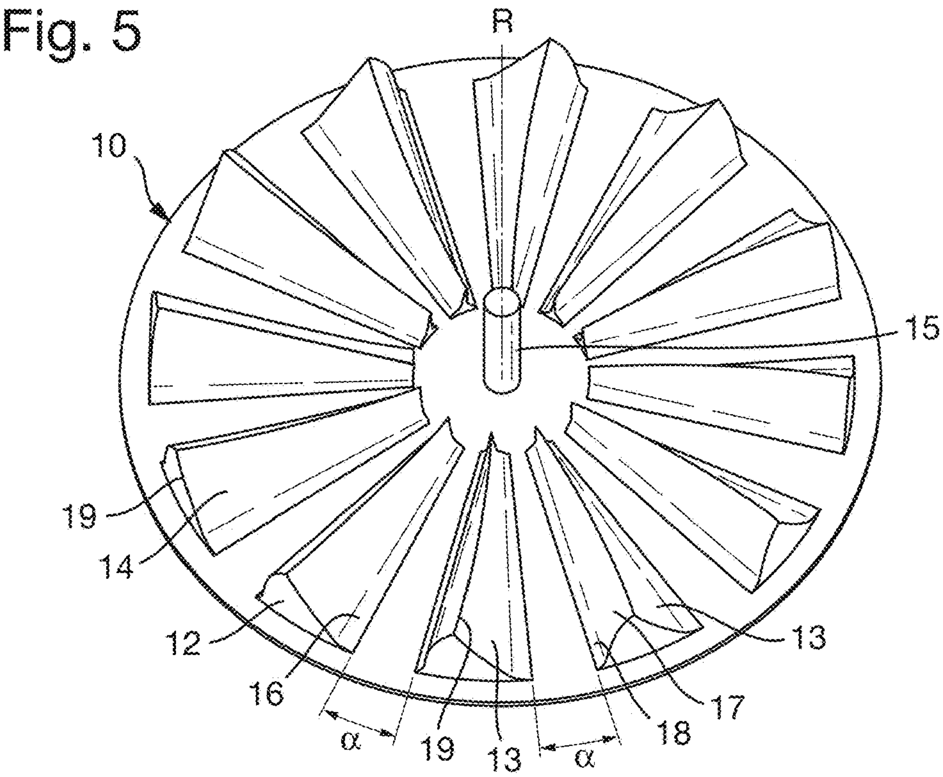
FIG. 5 shows a perspective view of the valve plate of the check valve of FIG. 1.
Figure 6:
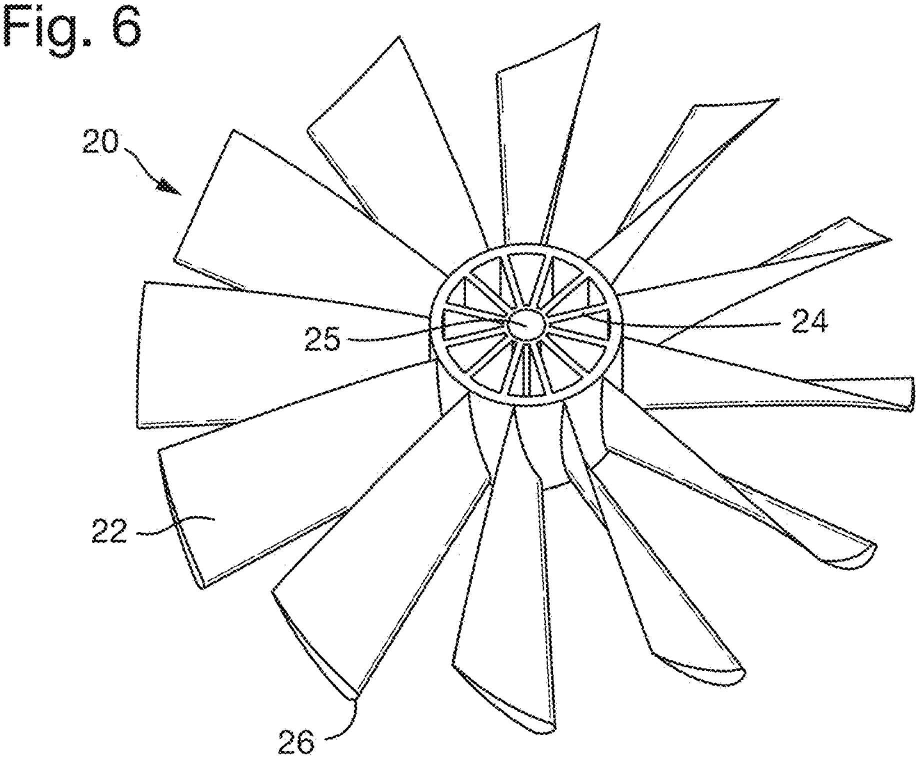
FIG. 6 shows a perspective view of the rotary element of the check valve of FIG. 1.

As can be seen more clearly in FIGS. 5 and 6, valve plate 10 comprises a shaft 15 that extends along rotational axis R and rotary element 20 comprises a bore 25 through the central hub 24 that fits over shaft 15 to allow rotary element 20 to be mounted rotatably to valve plate 10. A bearing (not shown) may be mounted around the shaft 15 and the bore 25 to allow rotation of the rotary element 20 around the shaft 15. Alternatively, any other suitable means of providing rotatable mounting of the rotary element 20 to the valve plate 10 as would be understood by one skilled in the art, may be used within the scope of this disclosure.

The valve plate 10 comprises a plurality of openings 13 therethrough. In this case, the openings 13 are generally triangular or trapezoidal in shape, however, any shape opening may be used within the scope of this disclosure.

The valve plate 10 also comprises shrouds 12 that extend upwardly from the valve plate 10 and around each opening 13. The shrouds 12 and the valve plate 10 define windows 14. Windows 14 face in at least partially a circumferential direction. As can be seen more clearly in FIGS. 2 and 5, shrouds 12 are shaped such that portions of the windows 14 face in radial and axial (i.e. in the direction of the rotational axis R) directions, in addition to the circumferential direction. However, in alternative embodiments, the windows 14 may only face the circumferential direction.

A lower portion of each window 14 adjacent the surface of the valve plate 10 is defined by a lip 16 upstanding from the valve plate 10. However, in alternative embodiments, valve plate 10 does not comprise such lips 16. The function of the lips 16 is described below in relation to the closing of the check valve 2.

In the depicted embodiment, the edges of windows 14 comprise a sealing element 19 thereon, which aids closing of the check valve 2 (as described in more detail below). Sealing element 19 may be a resilient and/or compliant material. In alternative embodiments, however, the edges of windows 14 do not comprise an additional sealing element 19.

Bumper surfaces 18 are formed on or associated with a rear surface 17 of shrouds 12. Bumper surfaces 18 are configured to contact a respective vane 22 along a length thereof, as will be described in more detail below in relation to the opening of the check valve 2. As shown in FIGS. 1 to 5, the rear surface 17 of shrouds 12 at least partially faces the circumferential direction (i.e. the rear surfaces 17 are the back surfaces on the body of the shrouds 12, opposite the windows 14). In the depicted embodiment, the bumper surface 18 comprises a separate bumper element attached to the rear surface of the shroud 12, however, in alternative embodiments, bumper surface 18 is just a specific area of the rear surface 17 of the shroud 12 that contacts a length of vanes 22 in the open position.

The rotary element 20 has a plurality of vanes 22 that extend radially from a central hub 24. The vanes 22 extend across the valve plate 10, in between adjacent shrouds 12, and have a leading edge 26 that faces the valve plate 10 surface and is separated by a small gap therefrom. In alternative embodiments, the leading edge 26 may be in loose contact with the valve plate 10, as discussed in more detail below.

There are the same number of vanes 22 as windows 14 (and also shrouds 12 and openings 13). The vanes 22 are angled relative to the rotational axis R, such that when fluid flow is incident on the vanes 22 in a direction parallel to the rotational axis R the rotary element 20 is forced to rotate.

The check valve 2 has a forward side and a backward side. The backward side is the side of the check valve 2 into which shrouds 12 extend, whereas the forward side is the opposite side to the backward side. When in use, the check valve 2 can encounter fluid flow in a positive (i.e. forward) flow direction or a negative (i.e. reverse) direction. In the positive flow direction, fluid passes from the forward side to backward side, through the openings 13 and windows 14, whereas in the negative flow direction, fluid attempts to pass from the backward side to the forward side through the windows 14 and openings 13.

Figure 1:
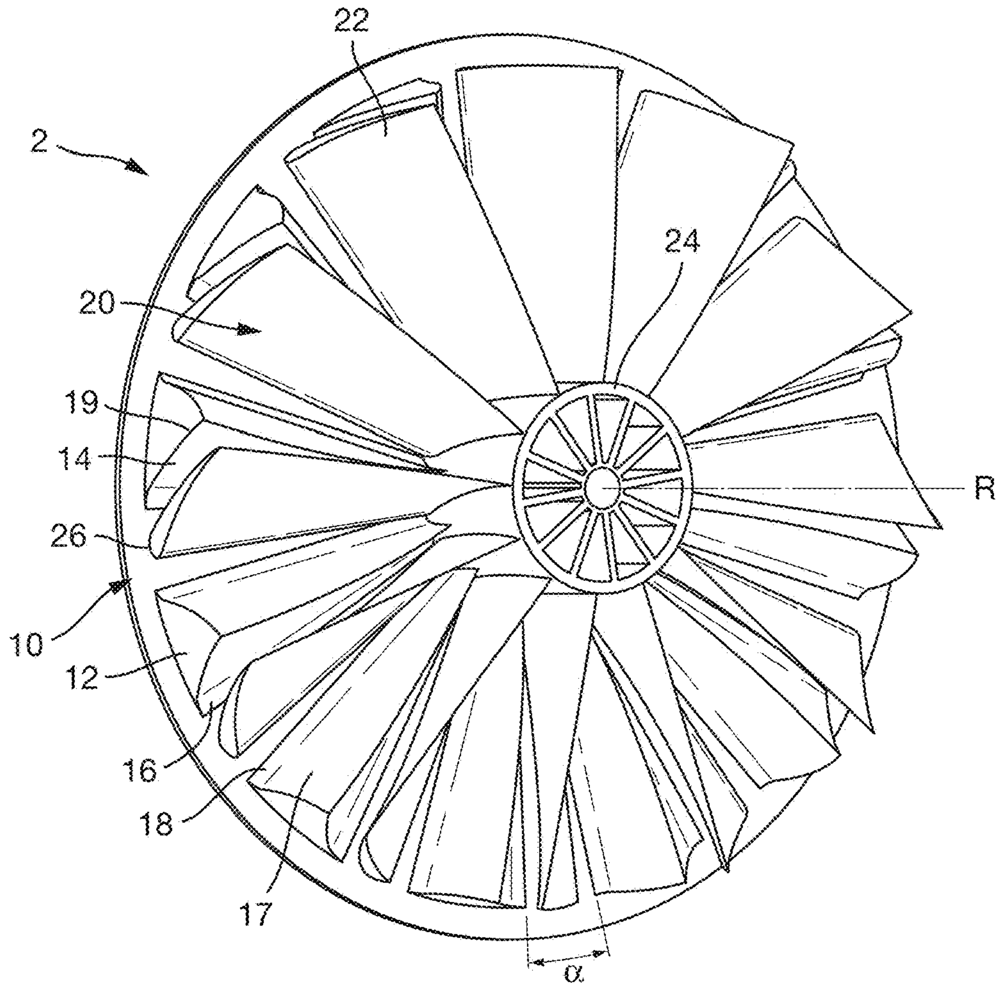
FIG. 1 shows a perspective view of an embodiment of a check valve in accordance with this disclosure, in an intermediate position between an open position and a closed position.
Figure 2:
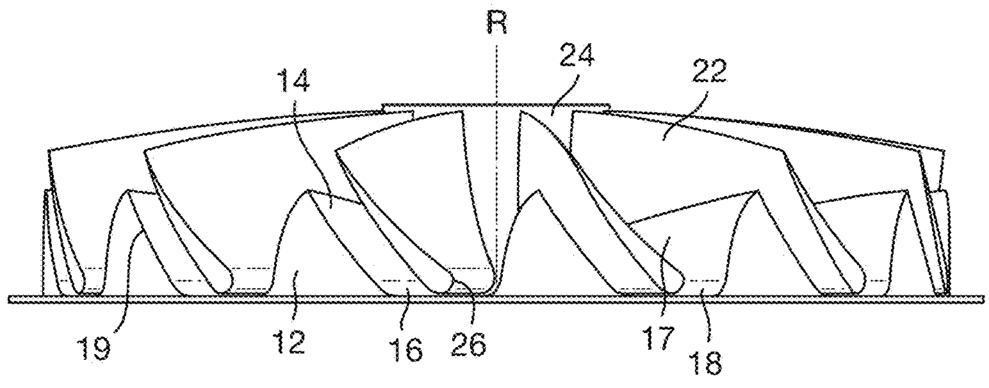
FIG. 2 shows a side elevation of the check valve of FIG. 1.
Figure 3:
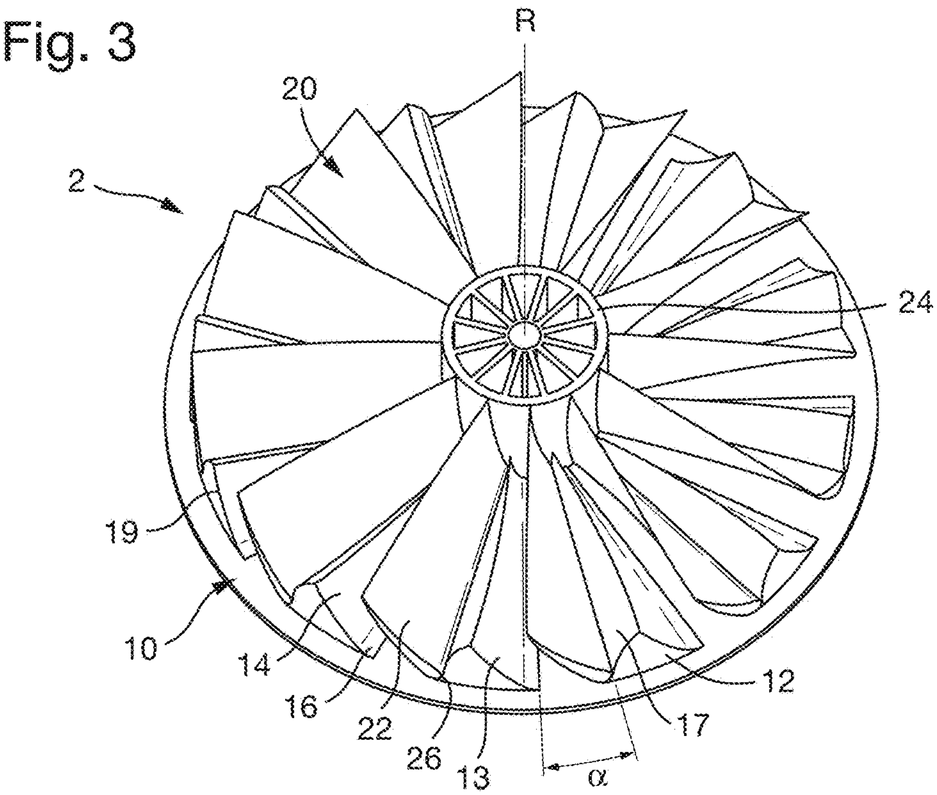
FIG. 3 shows a perspective view of the check valve of FIG. 1 in an open position.

When there is a positive flow differential across the check valve 2, fluid will flow in the positive flow direction and exit the valve 2 through windows 14. The fluid will be directed onto vanes 22 causing the rotary element 20 to rotate into an open position, which permits further fluid flow through the valve 2. As shown in FIG. 3, when fully open, a length of each vane 22 will be forced into contact with respective bumper surface 18. Rotation to this position causes the vanes 22 to exert a force on the bumper surfaces 18. The bumper surface 18 has a profile which is complementary to that of the vane 22 such that there is contact between them over an area rather than a line contact.

Figure 4:
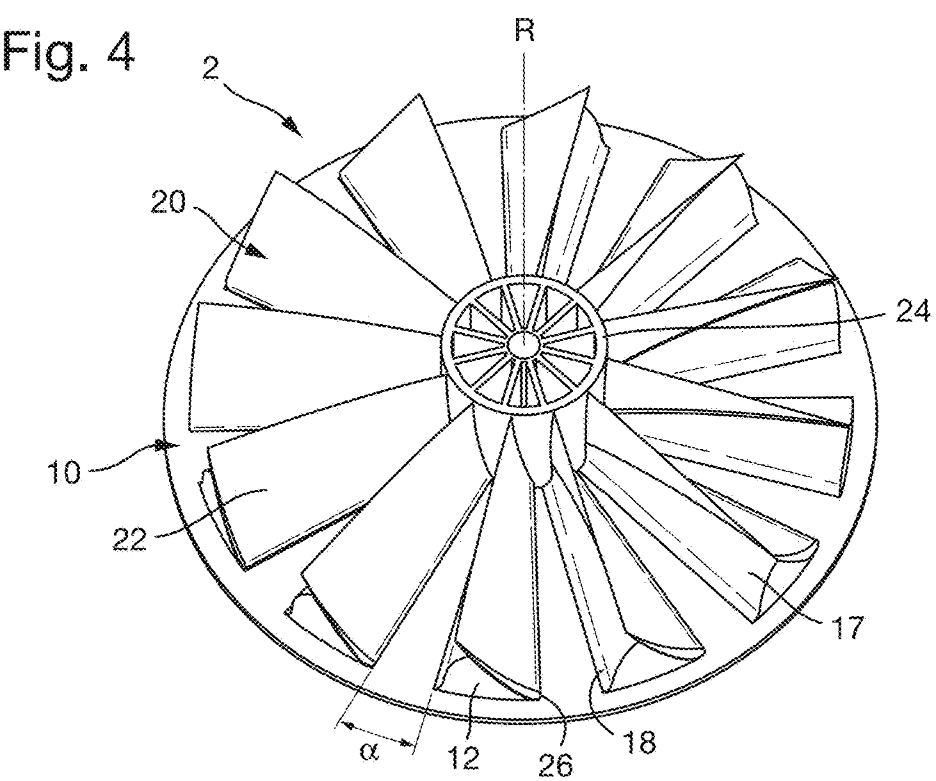
FIG. 4 shows a perspective view of the check valve of FIG. 1 in a closed position.

When there is a negative flow differential across the check valve 2, fluid will flow in the negative flow direction. In this case, fluid flow incident on vanes 22 will cause rotary element 20 to rotate each vane 22 into contact with windows 14 and lips 16. This prevents fluid from flowing through the windows 14 to the forward side of the check valve 2, placing the valve in a closed position, as shown in FIG. 4. Rotation to this position causes the vanes 22 to exert a force on the windows 14 and the lips 16.

In order to prevent fluid flow through the valve 2 in the closed position, the vanes 22 are sized and shaped to completely cover windows 14. The windows 14 and lips 16 are also contoured to complement the shape and profile of the vanes 22. Sealing elements 19 also act to aid sealing between the vanes 22 and the windows 14.

FIGS. 1 to 4 and 6 show vanes 22 having an airfoil cross-section, however, it is to be understood that vanes 22 may also be planar or have any other suitable cross-section, as would be apparent to one skilled in the art. In addition, vanes 22 may also comprise other characteristics such as a twist along their length (i.e. along their radial axis).

As will be understood by one skilled in the art, varying the vane 22 cross-section and characteristics may be used to tailor the force required to rotate the rotary element 20 to provide a certain cracking pressure (i.e. minimum force necessary for the valve 2 to rotate from a closed to an open position) or to change the valve's response time between opening and closing. It may also be used to tailor the amount of force that the vanes 22 exert on the windows 14, lips 16, sealing elements 19 and bumper surfaces 18, during opening and closing of the valve.

In embodiments not depicted, but within the scope of this disclosure, a biasing element may be used to bias the check valve 2 to a closed position. The biasing member may also be used to increase the cracking pressure of the check valve 2. The biasing member could be a spring attached between the shrouds 12 and the vanes 22, a spring attached between the hub 24 and shaft 15 or another means that inhibits the rotation of the rotary element 20 from the closed position to the open position.

In the depicted embodiment, the leading edge 26 is positioned above the valve plate 10 surface. In this way, the leading edge 26 and valve plate 10 do not contact each other as the vanes 22 rotate over the valve plate 10, minimising friction therebetween. However, in alternative embodiments, the leading edge 26 is in loose contact with the valve plate 10 surface. This aims to minimise fluid leakage between the leading edge 26 and the valve plate 10, without generating unacceptable friction or wear.

There are twelve openings 13 (and corresponding numbers of vanes 22 and shrouds 12) shown, however, it should be understood that only two or more openings (and corresponding numbers of vanes 22 and shrouds 12) are necessary for the check valve 2 to operate. It is believed that fewer openings 13 may increase the pressure drop across the check valve 2. However, as explained below, fewer openings 13 also increases the impact forces exerted by the vanes 22 on the windows 14, lips 16, sealing elements 19 and bumper surfaces 18. As will be understood by one skilled in the art, this trade-off can be used to tailor the number of openings 13 to the given application of the check valve 2. In certain embodiments, a suitable number of openings 13 is between 10 and 18.

The openings 13 and windows 14 are sized to allow sufficient fluid flow therethrough for the application at hand. The openings 13 and windows 14 may therefore be sized to have an area that is any percentage of the total valve plate 10 area, as a given application requires.

The size/number of openings 13, their spacing and subsequent number of vanes 22 dictates how much angular rotation rotary element 20 may undergo about rotational axis R between the open and closed positions. A lower angular rotation angle $\alpha$ decreases the impact forces exerted by the vanes 22 on the windows 14, lips 16 and bumper surfaces 18 when the valve 2 rotates to the closed and open positions. Thus, the number, size and spacing of the openings and the corresponding number of vanes 22 can be varied to reduce or increase the impact force as desired. In certain embodiments, a suitable angle of angular rotation is in the range $10° \leq \alpha \leq 20°$, particularly, $14° \leq \alpha \leq 18°$, and more particularly $\alpha = 16°$. However, any angular rotation angle between $0° < \alpha < 180°$ can be used, within the scope of this disclosure.

The reduction of the impact force provided by the combination of the openings 13 and vanes 22 and any of their characteristics (as described above) may improve the life of the check valve 2.

The relatively large size of the windows 14 spreads the impact force over a larger area relative to other check valves designs, which acts to reduce the stress caused thereby. Lips 16 and sealing elements 19 may also act as areas of reinforcement for windows 14, which aids the absorption of stress exerted on the windows 14. Bumper surfaces 18 may also act to reinforce the shrouds 12 and protect them from the force exerted on them by the vanes 22 rotating to the open position.

The various materials and manufacturing process that may be used to produce the check valve 2 will now be described.

The valve plate 10 and rotary element 20 may be made of a metallic material, a plastic material or a composite material, as a given application or working environment requires. For instance, they may be made of aluminum, titanium, steel or an alloy thereof. They may alternatively be made of an Ni-based alloy. Depending on the application of the check valve 2, they may be corrosion resistant or have a corrosion resistant coating applied thereto. In addition or alternatively, they may also have a heat resistant coating applied thereto.

The valve plate 10 and rotary element 20 may be additively manufactured or subtractively manufactured (e.g. machined). Alternatively, they may be cast. The shrouds 12 and shaft 15 may be integrally formed as part of the valve plate 10 or may be produced as separate components and coupled thereto. The vanes 22 may be integrally formed as part of the rotary element 20, or may be separate components coupled thereto.

Lips 16, sealing elements 19 and bumper surfaces 18 may be separate components from the valve plate 10 and coupled thereto, or alternatively, may be integrally formed as part of the valve plate 10. The lips 16, sealing elements 19 and bumpers 18 may be made of the same material as the valve plate 10, or a different material. Lips 16, sealing elements 19 and bumpers 18 may be made of a more compliant material than valve plate 10, such as a rubberised material, to better absorb impact forces or provide improved sealing. Alternatively, the lips 16, sealing elements 19 and bumpers 18 may have undergone a hardening treatment to make them more resilient to impact forces.

Although the figures and the accompanying description describe particular embodiments and examples, it is to be understood that the scope of this disclosure is not to be limited to such specific embodiments, and is, instead, to be determined by the following claims.

The invention claimed is:

1. A check valve comprising:

a valve plate comprising a plurality of openings therethrough;

a shroud extending from the valve plate around each of the openings, the shroud and the valve plate defining an at least partially circumferentially facing window; and a rotary element rotatably mounted to the valve plate about a rotational axis (R), the rotary element comprising a plurality of radially extending vanes, the rotary element mounted such that each vane is positioned between two adjacent shrouds;

wherein the vanes are angled such that fluid flow incident thereon in a direction parallel to said rotational axis (R) will rotate the rotary element about the rotational axis (R); and wherein the rotary element is rotatable between an open position in which the vanes are spaced circumferentially from the windows to allow fluid to flow through the windows via the openings, and a closed position in which the vanes close the windows, thereby preventing fluid flow therethrough.

2. The check valve of claim 1, wherein a lower portion of the window is defined by a lip upstanding from the valve plate.

3. The check valve of claim 2, wherein the lip has a profile complementary to that of the vane to create an area contact therebetween.

4. The check valve of claim 1, wherein the vanes engage around the respective edges of the windows to close the windows.

5. The check valve of claim 4, wherein a sealing element is provided around the edges of each window.

6. The check valve of claim 5, wherein the sealing element is resilient.

7. The check valve of claim 1, wherein each shroud comprises a bumper surface configured to contact a respective vane along a length thereof in the open position.

8. The check valve of claim 7, wherein the bumper surface has a profile complementary to that of the vane to create an area contact therebetween.

9. The check valve of claim 8, wherein the bumper surface comprises a separate bumper element.

10. The check valve of claim 1, wherein the vanes rotate about the rotational axis (R) between the closed and open valve positions through an angle (a) of between 10° and 20°, more narrowly 14° to 18°, for example, 16°.

11. The check valve of claim 1, wherein the valve plate comprises between 10 and 16 openings and the rotary element comprises the same number of vanes.

12. The check valve of claim 11, wherein the valve plate comprises 12 openings and the rotary element comprises 12 vanes.

13. The check valve of claim 1, wherein the vanes have an airfoil cross-section.

14. The check valve of claim 1, wherein the vanes feature a twist along their radial axis.

15. The check valve of claim 1, wherein the rotary element is rotatably mounted onto a shaft extending from the valve plate.

* * * * *